US012578566B2

(12) United States Patent　　　　　(10) Patent No.:　US 12,578,566 B2
　　　Kalkbrenner et al.　　　　　　　　(45) Date of Patent:　　Mar. 17, 2026

(54) METHOD, ARRANGEMENT AND MICROSCOPE FOR THREE-DIMENSIONAL IMAGING IN MICROSCOPY USING AN ASYMMETRIC PSF

(71) Applicant: Carl Zeiss Microscopy GmbH, Jena (DE)

(72) Inventors: Thomas Kalkbrenner, Jena (DE); Joerg Siebenmorgen, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 410 days.

(21) Appl. No.: 18/159,228

(22) Filed: Jan. 25, 2023

(65) Prior Publication Data

US 2023/0236400 A1　　Jul. 27, 2023

(30) Foreign Application Priority Data

Jan. 26, 2022　　(DE) ..................... 10 2022 200 841.3

(51) Int. Cl.
　　　*G02B 21/00*　　　　(2006.01)
(52) U.S. Cl.
　　　CPC ....... *G02B 21/008* (2013.01); *G02B 21/0032* (2013.01); *G02B 21/0072* (2013.01)
(58) Field of Classification Search
　　　CPC .............. G02B 21/008; G02B 21/0032; G02B 21/0072; G02B 21/367; G02B 21/361; G02B 21/02; G02B 21/06; G02B 21/365
　　　See application file for complete search history.

(56) References Cited

U.S. PATENT DOCUMENTS

2013/0120539 A1　　5/2013　Foelling
2014/0099659 A1*　4/2014　Keller .................. G02B 21/362
　　　　　　　　　　　　　　　　　　　　435/29
2014/0340483 A1　11/2014　Ritter et al.
　　　　　　　　　　　　　(Continued)

FOREIGN PATENT DOCUMENTS

DE　　　102011055294 A1　　5/2013
DE　　　102013208926 A1　　11/2014
　　　　　　　　　(Continued)

OTHER PUBLICATIONS

Sri Rama Prasanna Pavania, et al., Three-dimensional, single-molecule fluorescence imaging beyond the diffraction limit by using a double-helix point spread function, PNAS, (Mar. 3, 2009) vol. 106, No. 9, p. 2995-2999.

*Primary Examiner* — Cara E Rakowski
(74) *Attorney, Agent, or Firm* — DUANE MORRIS LLP

(57)　　　　　　ABSTRACT
A method, an arrangement for microscopy and a microscope for three-dimensional imaging in microscopy, in which aberrations of a specimen detection radiation coming from a specimen are corrected in a detection beam path by means of a correction element and the corrected specimen detection radiation is captured in a spatially resolved form. The inventions are distinguished by the fact that a best-possible correction setting of the correction element, with which aberrations occurring at the time are reduced as much as possible, is determined; and, on the basis of the best-possible correction setting, a flawed correction setting is determined, a setting with which aberrations occurring lead to an asymmetric point spread function of the specimen detection radiation.

11 Claims, 9 Drawing Sheets

(56)  References Cited

U.S. PATENT DOCUMENTS

2016/0291303  A1      10/2016  Degen et al.
2019/0170995  A1       6/2019  Siebenmorgen et al.
2020/0150044  A1       5/2020  Kalkbrenner et al.
2022/0283443  A1 *     9/2022  Xu ...................... G02B 21/367

FOREIGN PATENT DOCUMENTS

DE       102013112600  A1      5/2015
DE       102016212020  A1      1/2018
DE       102018128590  A1      5/2020
WO         2012039636  A2      3/2012

* cited by examiner

-Prior art-

METHOD, ARRANGEMENT AND MICROSCOPE FOR THREE-DIMENSIONAL IMAGING IN MICROSCOPY USING AN ASYMMETRIC PSF

RELATED APPLICATIONS

The present application claims priority benefit of German Application No. 10 2022 200 841.3 filed Jan. 26, 2022, the contents of which are incorporated by reference in its entirety.

FIELD OF THE INVENTION

The invention relates to a method for three-dimensional imaging in microscopy using an asymmetric point spread function (PSF). The invention also relates to an arrangement and a microscope for carrying out the method.

BACKGROUND OF THE INVENTION

In the area of microscopy, in particular when imaging using marked structures and molecules (objects) of a biological specimen, a high image resolution is desired, with at the same time low levels of stress for the specimen and the objects to be imaged. Minimizing the stress on the specimen is particularly advantageous if the capture of the image data (image recording) takes place over a lengthy illumination time period and/or a number of times. Such illumination regimes are used for example when changes in location of one or more objects over a specific time period are to be detected and captured (tracking).

It is known from the prior art that illumination of a specimen with a light sheet essentially excites only the marked objects in a thin illuminated plane for emitting a detection radiation (see for example DE 10 2016 212 020 A1). The positions of the objects excited by means of the illumination radiation within the illuminated plane can be determined by means of a spatially resolving (two-dimensional) detector (camera), and in this way the origin of the respective detection radiation can be localized two-dimensionally.

To obtain in addition to a two-dimensional (2D) localization information on the position of the origin in the direction of an optical axis of the detection beam path (Zc direction; 3D), the point spread function may be modified in such a way that a rotational position and/or an outline shape of an imaging of a point light source can be used to draw inferences about the Zc position of the point light source.

For example, a light sheet may be radiated in offset from a focal position of a detection objective and the outline shape of the imaging of the point light source analyzed in order to determine the Zc position of the captured point light source (DE 10 2013 208 926 A1).

It is also possible that the PSF is formed into a double helix by means of a correspondingly designed mask (double-helix method), so that a point light source is imaged as two separate points of light. The relative rotational position of the points in relation to one another allows the determination of the associated Zc position (WO 2021/039636 A2; Pavani et al. 2009: Three-dimensional, single-molecule fluorescence imaging beyond the diffraction limit by using a double-helix point spread function; PNAS 106: 29954-2999).

A disadvantage of the solutions according to the prior art are the expensive masks required for producing a double-helix PSF and the very restricted extent to which the solution according to DE 10 2013 208 926 A1 can be used in optical arrangements in which in particular the optical axis of the detection beam path passes obliquely through separating layers of different refractive power, as is the case for example with inverted microscopes.

SUMMARY OF THE INVENTION

The invention is based on the object of proposing a method with which the disadvantages of the prior art are reduced and three-dimensional imaging with a high resolution is made possible. It is also the object of the invention to propose a suitable device, in particular an optical arrangement and a microscope with such an arrangement, by means of which the method can be performed.

The object is achieved by the subject matter of the independent and alternative independent claims. Advantageous developments are the subject of the dependent claims.

When performing a method according to the invention for three-dimensional imaging in microscopy, aberrations of a detection radiation coming from a specimen are corrected in a detection beam path by means of at least one correction element. The specimen is in this case provided in particular with marker molecules (also: probes, markers), such as for example fluorescent dyes (fluorophores), so that specifically image data, for example of specific structures and/or molecules of the specimen, can be captured. The detection radiation may in this case be an illumination radiation that is completely reflected or reflected over specific wavelength ranges. The detection radiation may also be a fluorescence radiation emitted by the fluorescent dyes, which has been excited by the effect of a corresponding illumination radiation. The detection radiation corrected by means of the correction element is captured in a spatially resolved form by a suitable spatially resolving two-dimensional detector. A detection plane of the detector is in this case preferably aligned essentially orthogonally in relation to the optical axis of the detection beam path.

According to the invention, the method is distinguished by the fact that a best-possible correction setting of the correction element, with which aberrations occurring at the time are reduced as well as possible, is determined. The best-possible correction setting is in this case a setting of the correction element that is optimized in accordance with the technical and optical conditions, in particular with regard to the technical elements and dimensionings of the detection beam path. In order to determine a best-possible correction setting, a point spread function, also referred to hereinafter as the detection PSF, may be determined by a series of tests and/or simulation and stored in a retrievable manner in particular before the method is actually carried out.

The presence of at least one correction element is essential for the invention. This is usually arranged in the detection beam path. As an alternative or in addition, there may be a correction element in an illumination beam path. It is important that its effect on the forming of the detection PSF is as provided by the invention. For simplicity, hereinafter reference is mostly made just to a correction element.

On the basis of the best-possible correction setting, a flawed correction setting is determined, a setting with which aberrations occurring, in particular persisting, lead to an asymmetric point spread function of the detection radiation. In this case, the flawed correction setting should allow qualitatively sufficient capture of image data and at the same time provide information on the position of the point light source in the direction of the optical axis. The asymmetric detection PSF occurring with the flawed correction setting is determined empirically or computationally by means of a simulation and provided for a further processing of captured image data. An empirical determination and a computational determination may be combined with one another.

An assessment of when a suitable flawed correction setting is achieved may be carried out for example on the basis of the Fisher information known from the prior art (also see in this respect the aforementioned: Pavani et al. 2009).

The best-possible correction setting does not actually have to be set. It is sufficient if it is theoretically known. Equivalent to this is the obvious approximation to a best-possible correction setting, if it is determined sequentially in the course of feedback control. An obvious approximation is obtained for example if the aberrations of an image capture fall below a predetermined limit value.

The flawed correction setting thus determined is brought about for example by the correction element being actuated and correspondingly set. After providing the flawed correction setting, image data of the specimen are captured two-dimensionally. On the basis of the respective captured manifestation of the asymmetry of the detection PSF, a position, in particular in the form of a coordinate, in the direction of the optical axis of the detection beam path (from here on also: the Zc position) is in each case assigned at least to selected image data and preferably stored. The captured image data allow a three-dimensional representation of the captured image data.

The essence of the invention is the use of a correction element, provided for the correction of aberrations occurring, in order with its help to produce an asymmetric detection PSF. Contrary to the function originally envisaged for the correction element of the fullest-possible correction of existing aberrations of the detection radiation, it is deliberately transformed into a flawed correction setting. However, the resultant disadvantage of a non-optimized correction surprisingly allows information on a Zc position of captured image data to be achieved.

Some of the terms used in the course of this description of the invention are to be explained in more detail below.

Because of its construction and the properties and settings at the time of the optical elements arranged in it, the detection beam path causes a specific behavior of the detection radiation during its propagation along the detection beam path. This modified propagation behavior is expressed here by the detection PSF.

An illumination of the specimen to be imaged may take place by at least one illumination spot moved over the specimen in a scanning manner or a linear illumination, where the latter can likewise be moved in a scanning manner. An areal illumination may also take place. One embodiment of an areal illumination may be for example a light sheet, or the areal illumination is performed in the form of a widefield illumination.

Throughout the rest of this description, reference is made by way of example to an illumination by means of a light sheet (see below). If such a light sheet is used, it also causes a contribution to the detection PSF, which may be referred to as the light-sheet PSF. The detection PSF is understood here for simplicity as being a result of the optical properties for example of the illumination and of the detection beam path. For the sake of simplicity, contributions for example by the specimen to the detection PSF are subsumed under the light-sheet PSF.

In the idealized case, a PSF has a form which is formed symmetrically about a focal position of the detection beam path, in particular a detection objective, in the direction of the optical axis (Zc direction) (see annexed figures).

Within the scope of this invention, an asymmetric PSF is understood as meaning a detection PSF which has a specific form of its cross section and/or a specific size of its cross section in the Zc direction at each Zc position. On the basis of the form, alignment and/or size of the cross section, a Zc position can therefore be specifically assigned.

A light sheet should be understood as meaning an illuminated plane which can be produced for example by beam shaping by means of a cylindrical lens (static light sheet) or by rapidly moving a light beam back and forth, for example by means of a scanner (dynamic light sheet), as is known from the prior art.

The thickness of a light sheet in this case indicates the extent of the light sheet transversely to its plane and in the direction of the detection beam path perpendicular to the plane.

A structured light sheet can be produced by a plurality of non-diffraction-limited beams, for example Bessel beams and possibly sinc3 beams, being arranged next to one another in one plane. The distances between the beams are in this case chosen such that undesired illumination effects above and below the plane containing the beams, due to destructive interferences, are largely eliminated. Optionally, the beams may be moved in the plane in order to produce a homogeneous light sheet in the plane. Also optionally, in the plane there may be unilluminated regions between the unmoved beams.

In one configuration of the method according to the invention, the forming of the asymmetric detection PSF is brought about by means of an adapted design of the illumination radiation as a light sheet. In this case, the illumination radiation is directed along an optical axis of an illumination beam path into a specimen space and onto the specimen arranged there. In order to bring about an asymmetric detection PSF, either a position of the light sheet is set asymmetrically to the focal plane of the detection beam path and/or the light sheet is modulated in its manifestation asymmetrically and/or orthogonally in relation to the direction of the optical axis of the illumination beam path and is formed as a structured light sheet.

As already mentioned, with a light sheet a thin, areal region of the specimen can be illuminated and image data of this illuminated region can be captured. In order to scan a larger volume region of the specimen, the light sheet and the specimen may be moved into different positionings in relation to one another. The specimen or regions of the specimen are therefore scanned with the light sheet. Depending on the relative positioning of the light sheet and the specimen, for example at least one image is captured in each case.

In an advantageous configuration of the method, depending on the relative positioning, the regions of the specimen illuminated by the light sheet during a scanning operation overlap one another by a fraction of the thickness of the light sheet. In this way, uncaptured regions between the individual positionings are avoided.

The invention not only makes three-dimensional imaging possible but also allows tracking of movements of individual objects in a volume of the specimen (particle tracking; single molecule tracking). For this purpose, changes in location of at least one object of the specimen over an illumination time period are captured. If changes in location of a plurality of objects are to be captured, the scanning of the volume advantageously takes place by illuminating at each positioning once, in particular by means of an illumination radiation formed into a light sheet. In this case, the scanning speed, that is to say in particular the illuminating or capturing time for each positioning, can be adapted to the respective specimen and/or the optical parameters. For example, the capturing time may be chosen to be of such a length that a desired number of localizations of each object to be tracked has been achieved. The individual positionings of the light sheet advantageously overlap by a proportion of the thickness of the light sheet, in order to achieve a continuous image reproduction of the scanned volume.

If few objects or only a single object is/are to be captured and localized, the positioning of the light sheet may be controlled and corrected in dependence on the captured changes in location. For example, the light sheet may be corrected if it is found that the tracked object will leave the light sheet. In any event, because of the asymmetric detection PSF, along with a two-dimensional localization, the capture of associated Zc positions is also possible, so that a three-dimensional imaging can take place without an additional optical element in the detection beam path.

It is also possible that the volume to be scanned is passed over a number of times and with shorter illumination periods each time. A number of objects are thereby captured in each individual capture. The scanning is repeated often enough until a sufficient number of objects and/or object captures (localizations) have taken place. This procedure is suitable for dynamic processes, for example for the tracking of multiple individual objects (single particle tracking).

A lateral, two-dimensional positional determination of the object may take place in a known way, for example by means of centroid determination, adapting a Gaussian mask, a 2D Gaussian function or an experimental PSF.

An arrangement for microscopy which comprises a detection beam path may be used for performing the method according to the invention. The detection beam path has an objective for capturing a detection radiation and a spatially resolving detector for the two-dimensional capture of image points of the detection radiation. A correction element for the correction of aberrations of the detection radiation is also arranged between the objective and the detector in the detection beam path. Furthermore, there is a control device (controller) for the actuation and controlled setting of the correction element. The control device is realized for example by a computer or a microcontroller.

The arrangement is distinguished by the fact that the control device is configured and set up to bring about a flawed correction setting on the basis of a best-possible correction setting, or a correction setting determined as the best possible, of the correction element, with which aberrations occurring at the time are reduced as well as possible, in order to produce an asymmetric point spread function of the detection radiation. The control device therefore has a memory structure (for example a RAM), in which the sequences of the method according to the invention are coded. Furthermore, there is a command structure (for example a CPU), which on the basis of the captured input signals, in particular the captured image data, generates control commands, the execution of which, for example by actuators of the correction element, leads to an asymmetric detection PSF.

In an advantageous embodiment of the arrangement according to the invention, the correction element is formed by at least one pair of Alvarez plates. The individual Alvarez plates can be set in relation to one another by means of suitable actuators.

Actuable digital micromirror arrays and/or spatial light modulators (SLMs) can also be used as correction elements.

The arrangement mentioned may be in particular in a microscope. The microscope may in this case be an upright microscope. However, the invention is implemented particularly advantageously in a microscope of an inverted embodiment. The inverted microscope in this case comprises an illumination optical unit with an illumination objective for the illumination of a specimen located on a specimen carrier in a specimen region of a specimen plane by means of an illumination radiation over an illumination beam path. Here, the optical axis of the illumination objective forms with the normal of the specimen plane with respect to which the specimen carrier is aligned an illumination angle that differs from zero.

In the illumination beam path there are means for beam shaping and for producing a light sheet of the illumination radiation. The beam-shaping means may be a cylindrical lens, a scanner and/or a spatial light modulator (SLM). The SLM serves especially for producing and providing a structured light sheet.

In the detection beam path there is a detection optical unit with a detection objective, the optical axis of which forms with the normal of the specimen plane a detection angle that differs from zero.

In addition to the at least one correction element in the detection beam path, the arrangement or the microscope may have a further optical element, which is designed for the pre-correction of aberrations caused by detection radiation and/or illumination radiation passing through media of different refractive power. The correction element serves for the correction of persisting aberrations.

A free-form element, which acts in such a way as to compensate for an average coverslip thickness, for example the thickness of a transparent base of the specimen carrier, for example a petri dish or a microtiter plate, may be used for example as the optical element for such a pre-correction (see for example DE 10 2013 112 600 A1). The optical element for the pre-correction may in this case take the form of a meniscus lens, which is arranged both in the illumination beam path and in the detection beam path. A meniscus lens has two side surfaces which are curved in the same direction.

A pre-correction of a vertical astigmatism occurring can also be corrected by the effect of a cylindrical lens, while a jump in the refractive index can be reduced for example by means of a concentric lens or by a prism, the latter being filled with an immersion medium.

BRIEF DESCRIPTION OF THE DRAWINGS

The invention is explained in more detail below on the basis of exemplary embodiments and illustrations, in which.

DETAILED DESCRIPTION OF THE DRAWINGS

In the following illustrations of the prior art and of possibilities for the embodiment of the invention, the same technical elements are denoted by the same reference signs.

It is merely by way of example that the exemplary embodiments are explained on the basis of an illumination in the form of a light sheet 6. Linear illuminations and illuminations moved in a scanning manner in the form of at least one spot or at least one line are also possible.

Figure 1:
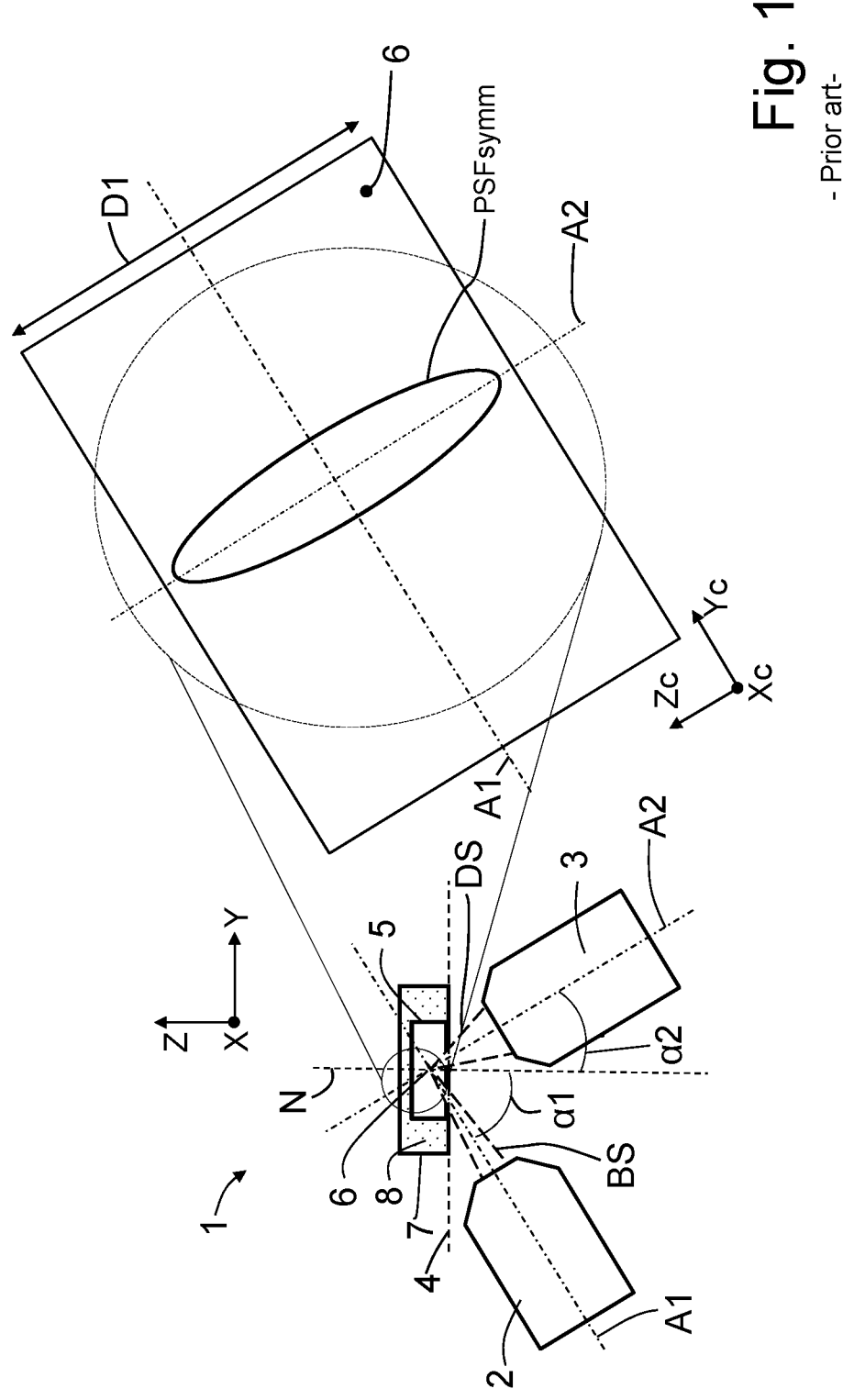
FIG. 1 shows a schematic representation of an inverted microscope and a symmetric point spread function in the case of an illumination with a light sheet of a first thickness according to the prior art.

FIG. 1 schematically shows an inverted microscope 1, in which an illumination radiation BS formed into a light sheet 6 is radiated by means of an illumination objective 2 along a first optical axis A1 of an illumination beam path into a specimen space, in which a specimen 5 is arranged. The specimen 5 has been placed on a specimen carrier 7, which is aligned in relation to a specimen plane 4 and through the base of which the illumination radiation is directed into the specimen space. The specimen carrier 7 is filled with a medium 8, in which the specimen 5 is located.

The optical axis A1 of the illumination beam path forms with a normal N of the specimen plane 4 an angle α1 that is different from zero, for example 60°. A second optical axis A2 of a detection beam path is directed at right angles onto the light sheet 6 and also forms with the normal N of the specimen plane 4 an angle α2 that is different from zero, which in this case is 30°. Detection radiation DS caused by the effect of the light sheet 6 in the specimen 5 is collected by means of a detection objective 3 and passed along the detection beam path.

The depicted enlargement of a detail shows a symmetric point spread function PSFsymm, which extends in the direction of the optical axis A2 of the detection beam path (direction of the Zc axis; Zc direction) and over a large proportion of the thickness D1 of the light sheet 6.

Figure 2:
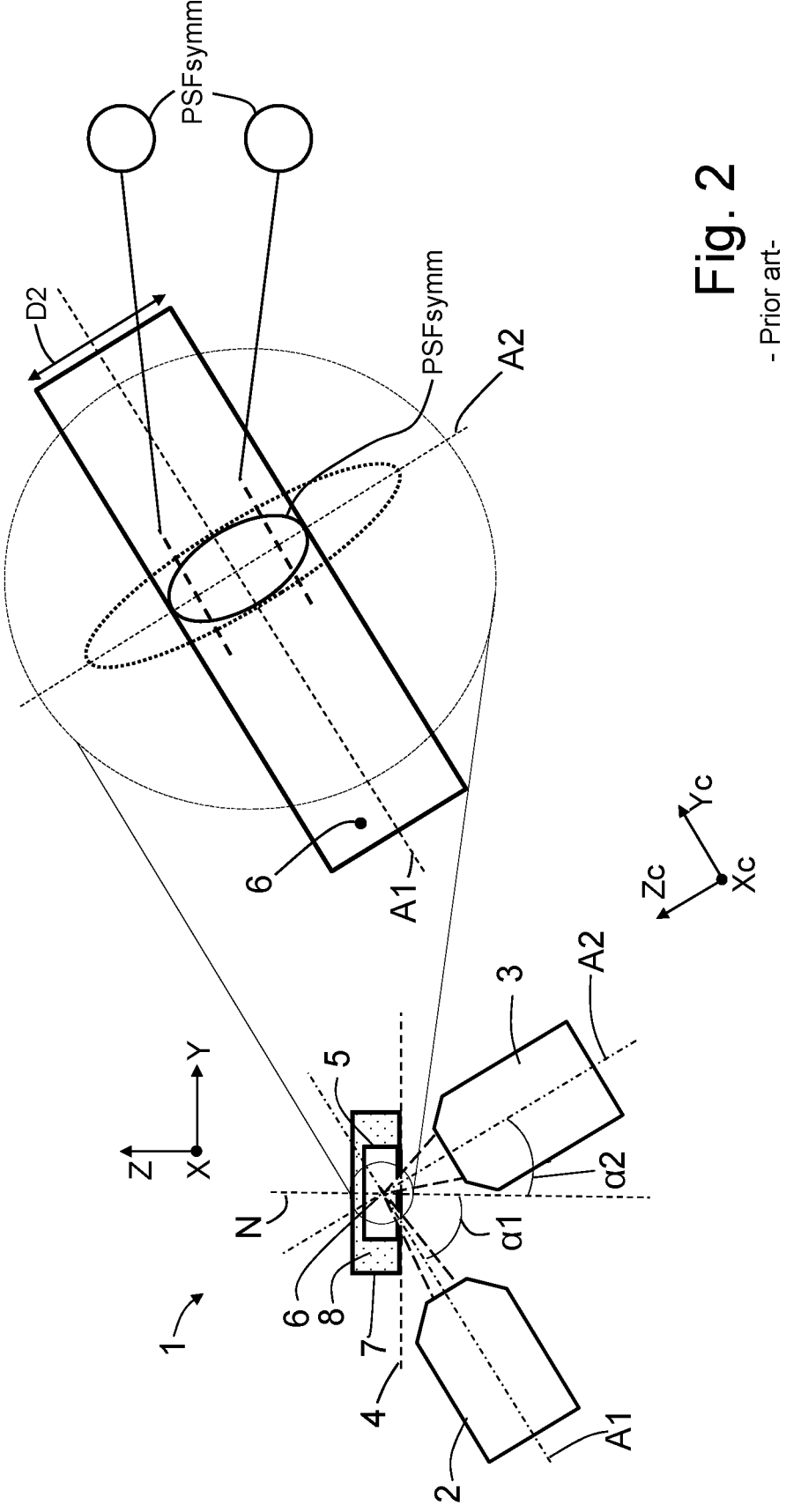
FIG. 2 shows a schematic representation of an inverted microscope and a symmetric point spread function in the case of an illumination with a light sheet of a second thickness according to the prior art.

FIG. 2 shows in the enlargement of a detail a symmetric point spread function PSFsymm of a light sheet 6, which has a smaller thickness D2 as compared with FIG. 1. The symmetric point spread function PSFsymm is also shorter in the Zc direction than the symmetric point spread function PSFsymm in relation to FIG. 1 (shown outlined by a dotted line for comparison) and extends over the entire thickness D2 of the light sheet 6.

Only by way of example and for simplicity, the cross sections of the symmetric point spread function PSFsymm are shown in two planes at an equal distance away from the first optical axis A1. The cross sections are the same as one another and do not allow any inference of their respective actual position in the direction of the Zc axis on the basis of their form and/or size. The same applies correspondingly to cross sections at an equal distance away from the first optical axis A1 of a thicker light sheet 6 according to FIG. 1.

Figure 3:
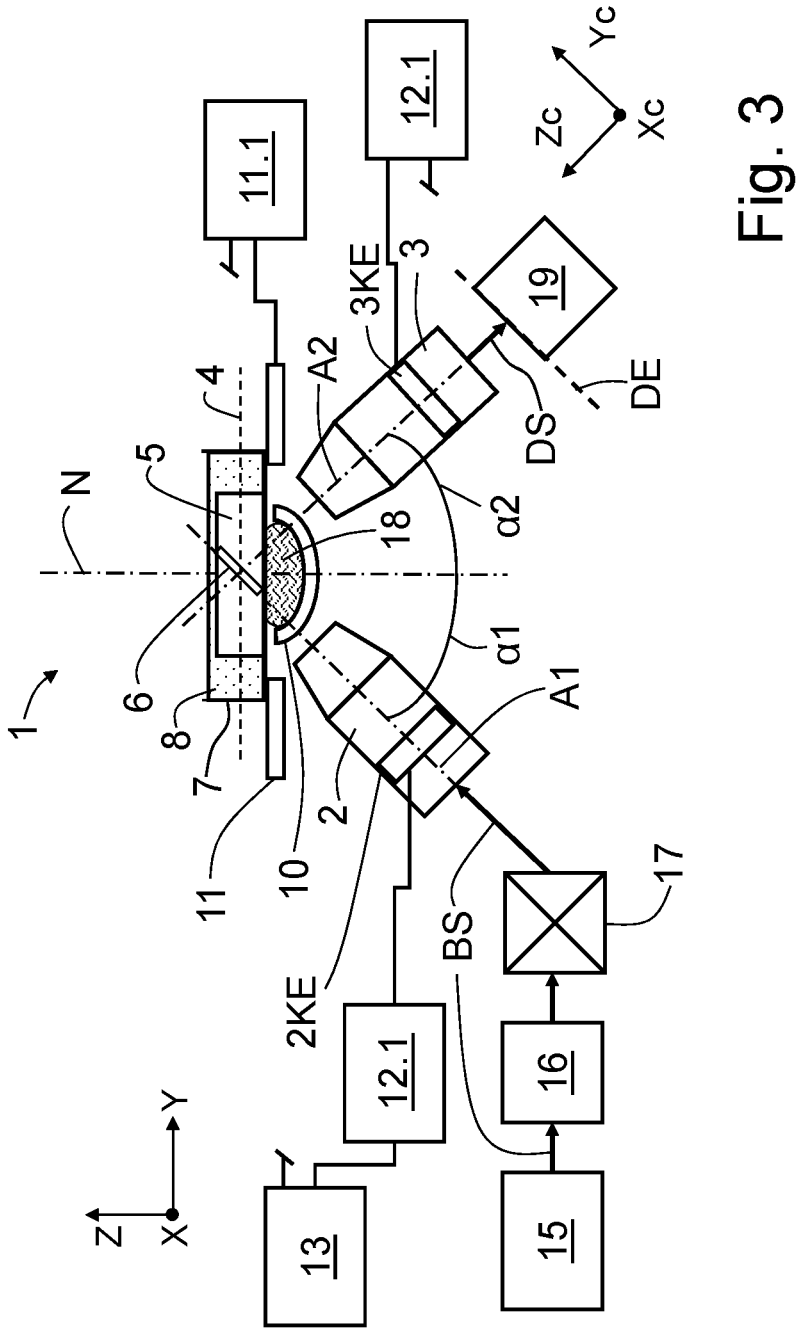
FIG. 3 shows a schematic representation of a first embodiment of a microscope according to the invention in the form of an inverted light-sheet microscope.
Figure 4:
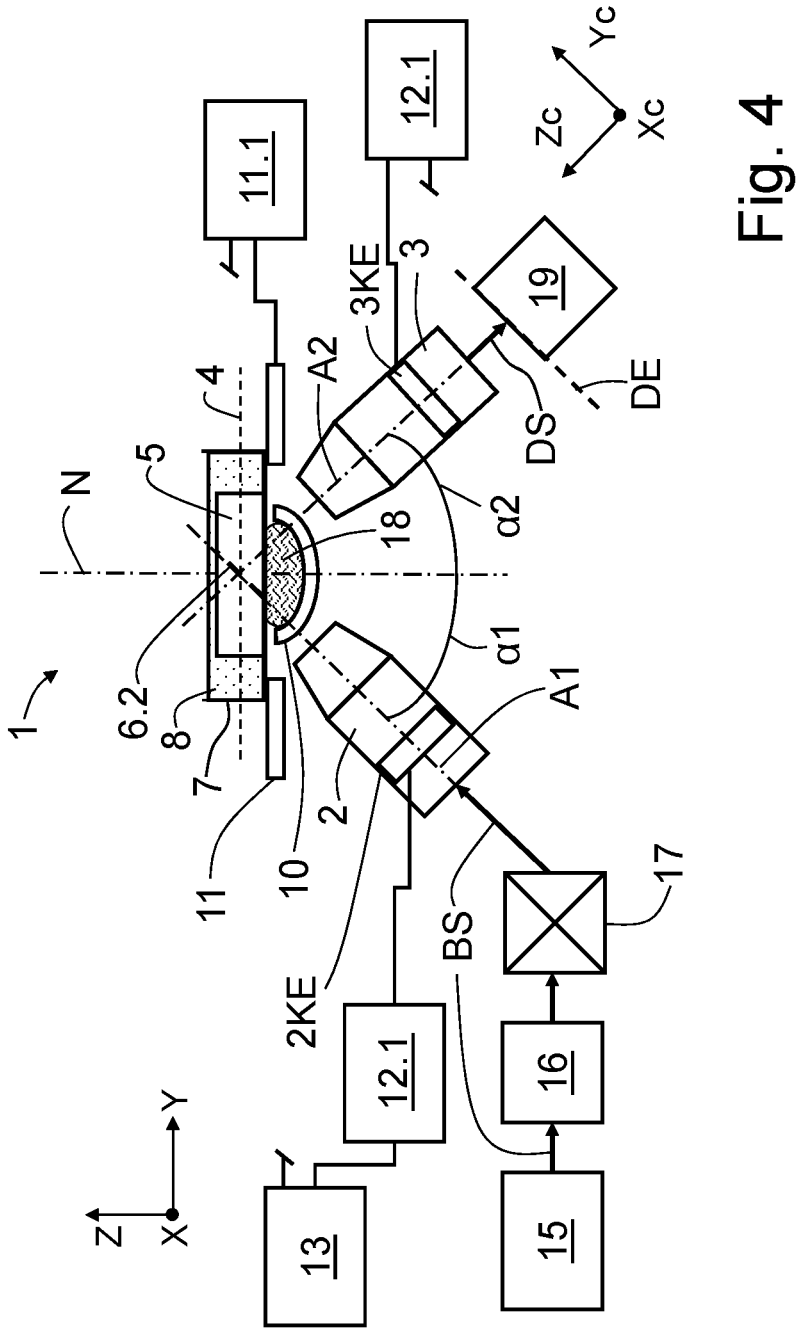
FIG. 4 shows a schematic representation of a second embodiment of a microscope according to the invention in the form of an inverted light-sheet microscope.

Before the invention is to be explained with regard to its configuration on the method side in the following illustrations of FIG. 4 to FIG. 9, a microscope 1 suitable for performing the method according to the invention, in particular a light-sheet microscope 6 (FIG. 3) of an inverted form, is shown in FIGS. 3 and 4 and explained in more detail.

The exemplary embodiment of the inverted microscope 1 designed for light-sheet microscopy has a controller 13, which is configured for performing the method. The light-sheet microscope 1 is shown with correction elements 2 KE, 3KE and an optical element 10 for the pre-correction of aberrations occurring in the form of a meniscus lens. The angles α1 and α2 between a normal B that is perpendicular to the reference plane 4 and the first optical axis A1 and the second optical axis A2, respectively, are each 45° in the exemplary embodiment. As adaptive correction elements 2KE, 3KE, there are in each case two Alvarez plates, which are arranged by means of actuators 12.1, for example in the form of an Alvarez manipulator, in the beam path of the illumination radiation BS and in the beam path of the detection radiation DS. In alternative embodiments, there are just an adaptive correction element 3KE and an associated actuator 12.1 in the detection beam path.

The correction elements 2KE, 3KE serve for the correction of aberrations which may occur on account of the oblique passage of the illumination radiation BS or the detection radiation through the base of the specimen holder 7. The optical element 10 in the form of the meniscus lens assists the transition of the illumination radiation BS from air into an immersion medium 18 and into the medium 8 and the transition of the detection radiation DS from the medium 8 into the immersion medium 18 and into the air.

The specimen holder 7 is held on a specimen stage 11. The specimen stage 11 itself is adjustable in a controlled manner in an X-Y plane, spanned by the X axis X and the Y axis Y, by means of actuators 11.1.

The illumination objective 2 and the detection objective 3 are optionally adjustable in a controlled manner along the first optical axis A1 and along the second optical axis A2, respectively, by means of an objective drive each (not shown), which may be formed as a piezo drive.

The illumination radiation BS is provided by a laser module 15 and shaped by means of a beam shaping 16. The beam shaping 16 is for example an optical unit, by means of which the provided illumination radiation BS is shaped, for example collimated. This may be for example a spatial light modulator (SLM). By means of the beam shaping 16, the illumination radiation BS has been formed into a light sheet 6 in a specimen space, in which the specimen 5 is located.

Downstream of the beam shaping 16 there is a scanner 17, by means of which the shaped illumination radiation BS is deflectable in a controlled manner in two directions (X-Y scanner).

Downstream of the scanner 17, the illumination objective 2 is arranged on the first optical axis A1. The illumination radiation BS that is deflected by the scanner 17 reaches the illumination objective 2 and it is further shaped and/or focused by the latter. The light sheet 6 is produced in the specimen region by an appropriate deflection of the illumination radiation BS by means of the scanner 17.

The detection radiation DS coming from the specimen 5 and from the specimen region is directed along the second optical axis A2 onto a detector 19 and can be captured by the latter in a detection plane DE.

For actuating the specimen stage 11, the actuators 11.1, the objective drives 14, the correction elements 2KE, 3KE or their actuators 12, the laser module 15, the beam shaping 16, the scanner 17 and/or the detector 19, there is a control unit 13, which is in a connection suitable for data transmission with the elements to be actuated (only indicatively shown).

In further embodiments, the control unit 13 is additionally configured for capturing, storing and/or evaluating measured values. Further elements and units of the microscope 1 may be actuable by means of the control unit 13 and/or measured values may be obtained and evaluated by them.

Aberrations that occur during an oblique passage of the illumination radiation BS through the specimen holder 7 are dependent on the thickness thereof. For this reason, the correction elements 2KE, 3KE, for example, are displaceably mounted in the illumination objective 2 and/or the detection objective 3, in order to match an aberration correction to the thickness by displacing the correction elements 12 in relation to one another.

For description purposes, two coordinate systems with mutually orthogonal axes are used below. The first coordinate system is the coordinate system of the entire arrangement with an X axis X, a Y axis Y and a Z axis Z. Ideally, the specimen holder 7, in particular the base thereof, is aligned parallel to an X-Y plane that is spanned by the X axis X and the Y axis Y. The second coordinate system is the coordinate system of the detector 19 with the X axis Xc, a y axis Yc and a z axis Zc. An imaging of, for example, an image from the image plane BE on the detector 19 has the coordinates Xc and Yc. The X axis Xc is directed orthogonally in relation to the plane of the drawing of the figures in both coordinate systems. The two other axes Y and Yc and Z and Zc, respectively, can be transformed into one another by way of a rotation about the X axis X.

Aberrations that occur during an oblique passage of the illumination radiation BS through the specimen holder 7 are dependent on the thickness thereof. For this reason, the Alvarez plates of the correction element 2KE, 3KE are mounted displaceably in relation to one another in the detection beam path. By means of a displacement of the Alvarez plates in relation to one another, an aberration correction can be performed.

The control device 13 is configured according to the invention in such a way that a flawed correction setting is brought about on the basis of a correction setting determined as the best possible of the correction element 2KE, 3KE, in order to produce an asymmetric point spread function of the detection radiation. The determined best-possible correction setting may in this case have been determined in advance and provided in a retrievable manner in a memory, for example as a subunit of the control device 13. The control device 13 retrieves the correction setting determined as the best possible for a setup at the time of the microscope 1, for example for a specific type of specimen, a wavelength of the illumination radiation, the immersion medium used, the type of light sheet 6 and the thickness D thereof and/or the focal length to be used for the detection objective 3. With this, the aberrations are corrected to the greatest extent and a symmetric point spread function PSFsymm of the detection is brought about as a result. Although such a symmetric point spread function PSFsymm allows a two-dimensional capture of the image data and their localization, it does not allow a determination of positions in the Zc direction.

On the basis of this best-possible correction setting, the Alvarez plates are displaced in relation to one another in such a direction and by such an amount that an asymmetric point spread function PSFasymm of the detection is brought about.

As an alternative to an illumination with a light sheet, the illumination radiation BS may be formed into at least one spot or into at least one line. In particular, an areal illumination and detection (widefield microscope) may also take place, as is shown in a simplified form in FIG. 4. The manifestations of the illumination as an illumination spot, illumination line or as an areal illumination (widefield illumination) are designated for simplicity by the reference sign 6.2. In other embodiments, the microscope 1 may be an upright microscope 1. The optical element 10 is optionally present for pre-correction.

Figure 5:
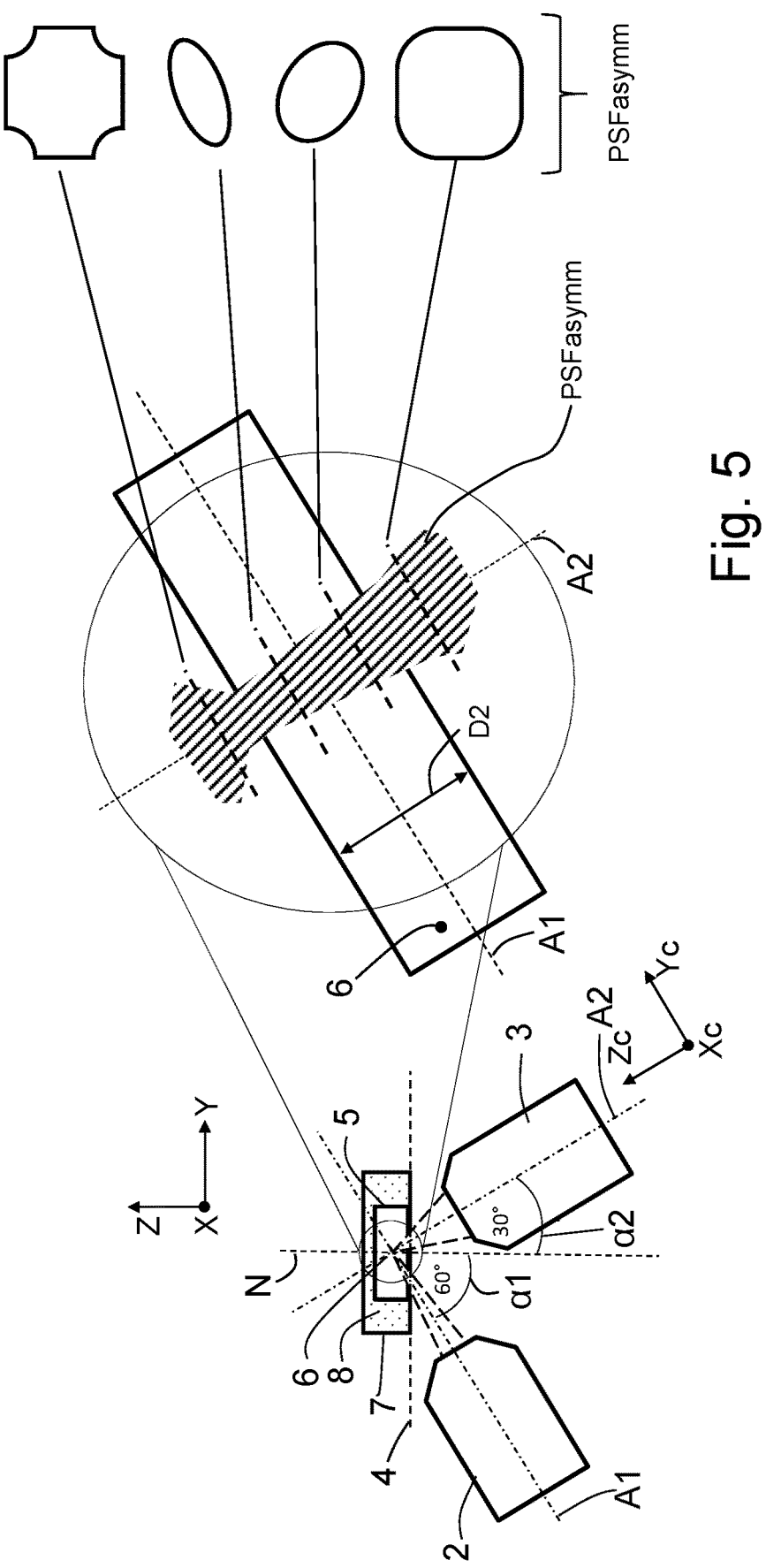
FIG. 5 shows a schematic representation of an exemplary embodiment of an inverted microscope according to the invention and a configuration of the method according to the invention with production of an asymmetric point spread function in the case of an illumination with a light sheet.

In FIG. 5, the effects of this formation of the point spread function PSFasymm according to the invention are illustrated. For the explanation, in each case two cross sections of planes at an equal distance away from the optical axis A1 are shown. Although both the two outer planes and the two inner planes are in each case at an equal distance away from the optical axis A1, their respective cross sections may distinctly differ from one another on the basis of their individual sizes, alignment and/or forms. For instance, the cross section shown in the enlargement of a detail at the top has an octagonal form with indented corners, while the cross section shown at the lowermost position is a square with rounded corners. Although the two cross sections in the middle are both ovals, they differ from one another by their respective dimensions and also their position (alignment) of the respective principal axes.

It is possible to assign precisely one position in the direction of the Zc axis (Zc position) to each combination of size and form. Apart from a localization of an image point in a two-dimensional image plane BE (see FIG. 3), therefore positional information with regard to its relative position in the direction of the Zc axis may also be assigned to an object captured by at least one image point and optionally stored.

Figure 6:
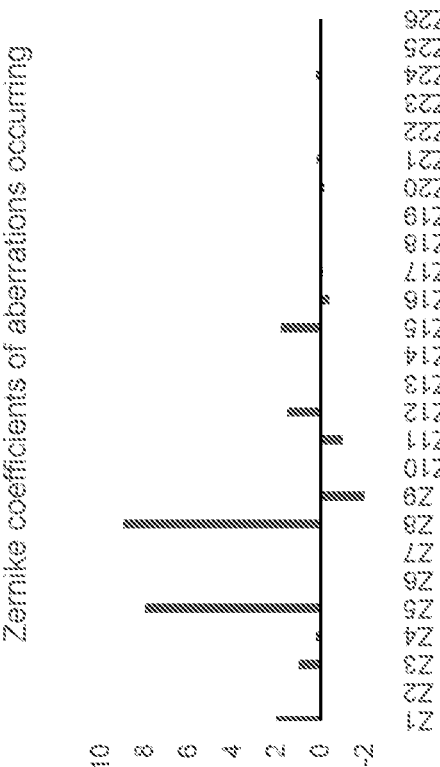
FIG. 6 shows an example of selection of Zernike coefficients of the aberrations caused because of radiation passing obliquely through a specimen holder.

The effects of an oblique passage of the illumination radiation BS and/or the detection radiation DS through the base of the specimen holder 7 are illustrated by way of example in FIG. 6 on the basis of Zernike coefficients. For instance, a wavefront when imaging through a coverslip (specimen holder 7) at an angle of 32° to the normal N has the Zernike coefficients shown in extract form. Very great contributions to the aberration occurring originate from vertical astigmatism (Z5) and vertical coma (Z8). Further contributions are based for example on the so-called trefoil (Z11), and aberrations of a higher order (for example secondary coma Z15) also contribute to the overall aberration.

In order, following the idea of the invention, to produce an asymmetric point spread function PSFasymm, a great contribution of the astigmatism (Z5) may be brought about for example in a flawed correction setting to be set.

Figure 7:
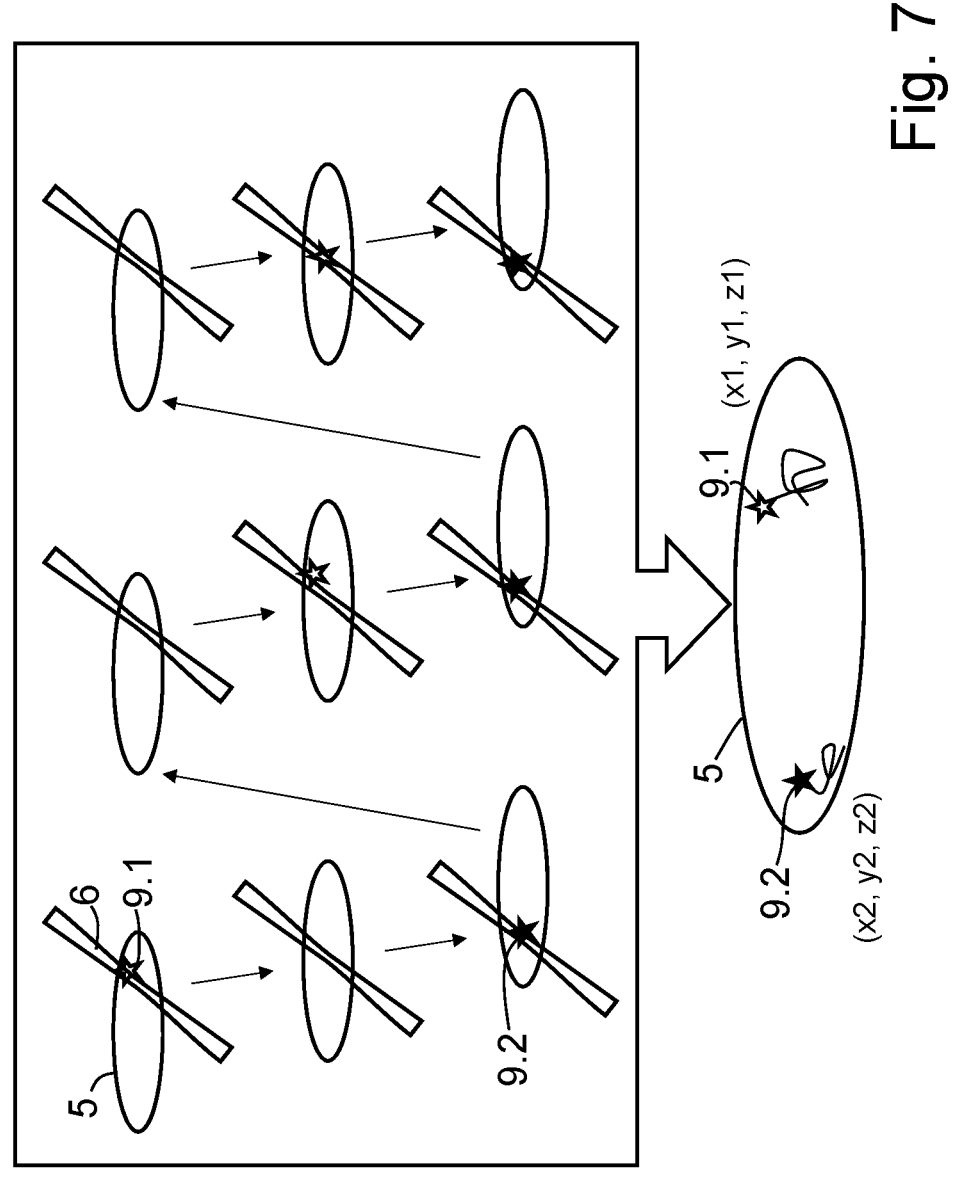
FIG. 7 shows a schematic representation of a configuration of the method according to the invention with repeated scanning of a specimen and the three-dimensional tracking of two objects of the specimen.

A configuration of the method according to the invention with repeated scanning of a specimen 5 and the three-dimensional tracking of two objects 9.1 and 9.2 of the specimen 5 is schematically represented in FIG. 7. In the individual positionings of the light sheet 6 that are shown by way of example, if appropriate the locations at which one of the objects 9.1 or 9.2 to be tracked is located in the region of the light sheet 6 are respectively shown. After a number of scannings of the volume of the specimen 5, a path of movement of each of the objects 9.1, 9.2 can be created from the collected image data and the information on the Zc position.

Figure 8:
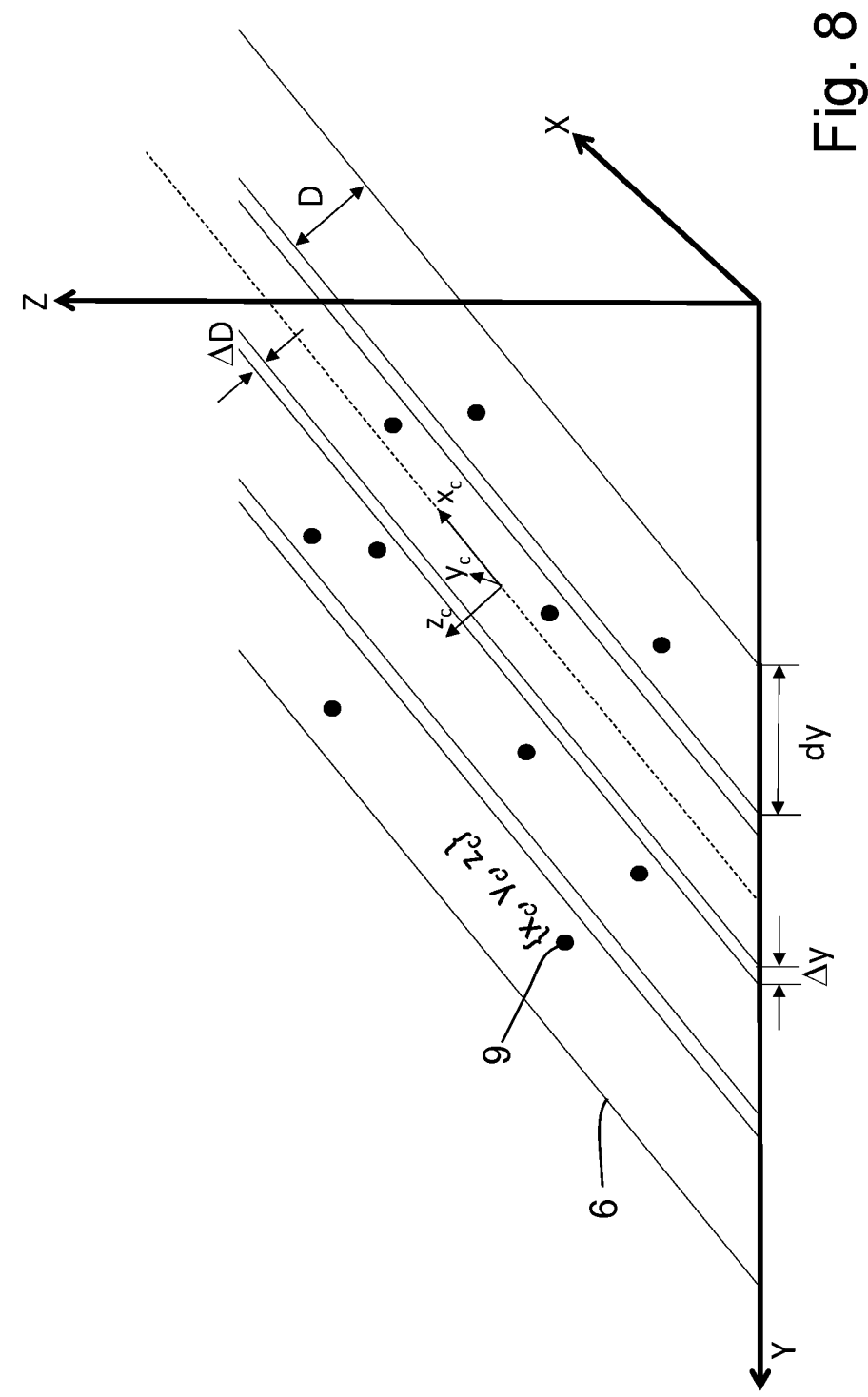
FIG. 8 shows a schematic representation of a coordinate transformation with a number of mutually offset light-sheet positionings of captured objects.

The already mentioned transformation of coordinates is shown by way of example in FIG. 8. In FIG. 8, several positionings of a light sheet 6 with a thickness D are shown. These positionings may be set by corresponding displacement of the specimen stage 11 and/or by changing the positioning of the light sheet. It may be advantageous here to provide an overlapping region ΔD between adjacent positionings of the light sheet 6. The coordinate region of the Y axis corresponding to a thickness D is denoted by dY and the coordinate region corresponding to the overlapping region ΔD is denoted by ΔY.

Within a positioning, the molecules are localized in the coordinate system of the detector 19 with the axes Xc, Yc and Zc. The respective positioning of the light sheet 6 is known (illustrated by way of example by an interrupted line). The object coordinates can be determined in relation to the light sheet 6 by means of known localization algorithms and by evaluation of the asymmetric point spread function PSFasymm coding the Zc position. The entirety of the found molecule coordinates of the specimen 5 can expediently be transformed into the coordinate system of the arrangement with the axes X, Y and Z after completion of the measurement (also see FIG. 7).

Figure 9:
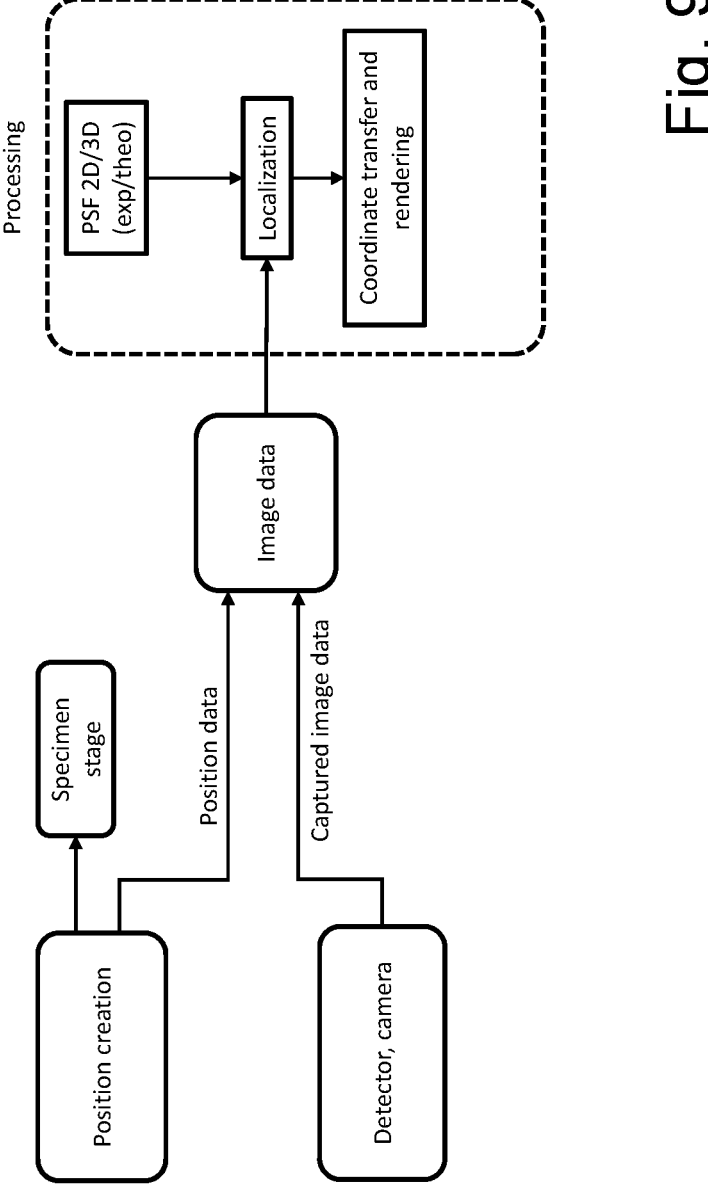
FIG. 9 shows a flow diagram of a configuration of the method according to the invention.

If the positioning of the light sheet 6 is to be changed, a corresponding command is produced by means of the controller 13 and transmitted to the actuator 11.1 of the specimen stage 11 and/or to the scanner 17 and is executed (FIG. 9). The position data at the time of the light sheet 6 in relation to the specimen stage 11—and consequently to the specimen 5 located on it—are captured and assigned to the image data captured at the positioning concerned. The position data and the image data are subsequently further processed, in order to determine the respective origins of the captured image data, in particular origins of captured detection radiation. Point spread functions that have been experimentally and/or theoretically determined in advance serve as a basis for this localization. Both a symmetric point spread function and an asymmetric point spread function may be used for a two-dimensional localization.

According to the invention, an asymmetric point spread function that has been produced in advance with knowledge of a best-possible correction setting, in particular of the correction elements present, is used for a three-dimensional localization. The determined coordinates of image points or their origins are subsequently optionally transferred into a coordinate system that is intuitively understandable for the user and/or suitable for subsequent processing steps and an image of the specimen 5 is created.

The method according to the invention is explained in more detail below with regard to FIGS. 3 to 8. A best-possible correction setting, in particular of the correction element 3KE, is determined as the basis for the method according to the invention. This may already take place before the actual image capture, by for example a best-possible correction setting being determined empirically and/or by using simulation models and stored in a repeatedly retrievable manner. In this case, the optical properties of the detection beam path, the specimen 5, the light sheet 6, if appropriate an optical element for the pre-correction 10, an immersion medium 18, a specimen carrier 7, a wavelength of the illumination radiation BS, properties of markers of the specimen 5 that are used and/or the illumination and detection angles alpha1 and alpha2 may be taken into account as parameters.

A best-possible correction setting may also be determined by the specimen 5 to be imaged being illuminated with the illumination radiation BS intended for the image capture, in particular with the light sheet 6 intended for this, and the detection radiation DS thereby brought about being captured. Using feedback control between the detector 19 and the actuators 12.1 of the correction element 2KE, 3KE, the best-possible correction setting can be sequentially determined and optionally stored. In this case, the controller 13 may comprise an analysis unit (for example a CPU, an FPGA), which is designed and configured for the evaluation of image data captured at the time and the generation of corresponding control commands for actuating the actuators 12.1.

The performance of the method therefore includes the step of retrieving or instantaneously determining a determined best-possible correction setting. On this basis, a flawed correction setting is determined, a setting with which the image capture is of sufficient quality but information on the Zc position of an origin of a captured point light source can also be extracted from the then asymmetric detection PSF.

The asymmetric detection PSF brought about with the flawed correction setting is also determined, for example by it being determined empirically, computationally or by a combined procedure. The determined asymmetric detection PSF is stored.

The admissible errors of such a flawed correction setting may be predetermined. In further configurations of the method, an admissible error may be established in the course of an instantaneous determination for example on the basis of a function of the technically feasible setting possibilities and a change in the aberrations occurring brought about thereby.

The determined flawed correction setting is set by generating corresponding control commands by means of the control device 13 and passing them to the actuators 12.1 of the correction element 2KE, 3KE, where they are converted into an actuating movement.

In order to carry out the image capture by using a light sheet 6, the specimen 5 and the light sheet 6 are positioned in relation to one another and the image capture is carried out. If a volume of the specimen 5 is to be scanned, the positioning of the specimen 5 and the light sheet 6 in relation to one another is changed correspondingly. This may take place by controlled movement of the specimen stage 11 and/or the light sheet 6. For each positioning, the associated position data are known and are assigned to the image data captured with the positioning concerned and are stored.

These image data provided with the position data may be analyzed subsequently or directly in real time, and if appropriate processed. In this case, the determined asymmetric detection PSF is used in order to assign a Zc position to the captured image data on the basis of the respectively captured manifestation of the asymmetric detection PSF.

Furthermore, the captured image data, in particular the imagings of respective point light sources, within the detection plane Xc-Yc of the detector 19 are localized, that is to say are in each case assigned to a pair of coordinates Xc and Yc and optionally stored.

The pairs of coordinates Xc and Yc can subsequently be transformed into coordinates X-Y, in order to be able to offer the viewer an image that corresponds to the alignment of the specimen 5 in relation to the specimen plane 4. The same applies correspondingly to a transformation of captured Zc coordinates into Z coordinates. Part of the processing may also be the conversion of the prepared image data into a graphic representation, for example on a monitor or display.

The image data captured at a positioning of the light sheet 6 are available after the processing with the respective spatial coordinates and optionally with the respective intensity values, so that the imaging can take place both two-dimensionally and three-dimensionally. As a result of the knowledge of the Zc positions, other sectional planes can also be calculated and visualized.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS

1 Light-sheet microscope
2 Illumination objective
2KE Illumination correction element
3 Detection objective
3KE Detection correction element
4 Specimen plane, reference plane
5 Specimen
6 Light sheet
6.2 Illumination spot, widefield illumination
7 Specimen holder
8 Medium
9.1 Object
9.2 Object
10 Meniscus lens; optical element (pre-correction)
11 Specimen stage
11.1 Actuator (of the specimen stage 11)
12 Actuator (of the correction elements 2KE, 3KE), Alvarez manipulator
13 Control unit; controller
14 Objective drive
15 Laser module, light source
16 Beam shaping
17 X-Y scanner
18 Immersion medium
19 Detector
A1 First optical axis (optical axis of the illumination objective 2)
A2 Second optical axis (optical axis of the detection objective 3)
$\alpha 1$ Angle/illumination angle
$\alpha 2$ Angle/detection angle
D1, D2, Dn Thickness of the light sheet 6
N Normal
PSFsymm Symmetric PSF
PSFasymm Asymmetric PSF

The invention claimed is:

1. A method for three-dimensional imaging in microscopy, comprising;
    illuminating a specimen located on a specimen carrier in a specimen region of a specimen plane with a light sheet;
        detecting specimen radiation coming from the specimen in a detection beam path, which has an optical axis;
        correcting aberrations of a detection said specimen radiation by means of a correction element arranged in the detection beam path;
        capturing the corrected specimen radiation in a spatially resolved form;

determining a best-possible correction setting of the correction element with which aberrations occurring at the time are reduced;
    determining a flawed correction setting on the basis of the best-possible correction setting, in which aberrations occurring lead to an asymmetric point spread function of the specimen detection radiation;
    determining the asymmetric point spread function occurring with the flawed correction setting;
    bringing about the flawed correction setting by actuating and setting the correction element accordingly;
    capturing image data of the specimen two-dimensionally; and
    on the basis of the respective captured manifestation of the asymmetry of the asymmetric point spread function, a position in the direction of the optical axis of the detection beam path is in each case assigned at least to selected image data.

2. The method as claimed in claim 1, wherein the forming of an asymmetric point spread function is brought about by means of an adapted design of illumination radiation as a light sheet by the illumination radiation being directed along an optical axis of an illumination beam path into a specimen space and onto the specimen arranged there;
    the light sheet being modulated in its manifestation orthogonally in relation to the direction of the optical axis of the illumination beam path.

3. The method as claimed in claim 2, wherein a volume of the specimen is scanned by the light sheet and the specimen being moved into different positions in relation to one another and, depending on the relative positioning, at least one image being captured in each case, wherein, depending on the relative positioning, the regions of the specimen illuminated by the light sheet overlap one another by a fraction of the thickness of the light sheet.

4. The method as claimed in claim 3, wherein changes in location of at least one object of the specimen over an illumination time period are captured, wherein the scanning of the volume takes place either
    i) by illuminating at each positioning once if changes in location of a plurality of objects are to be captured; or
    ii) by the positioning of the light sheet being controlled and corrected in dependence on the captured changes in location if a single object is captured and localized.

5. A microscope comprising:
    an illumination optical unit with an illumination objective for the illumination of a specimen located on a specimen carrier in a specimen region of a specimen plane by means of an illumination radiation over an illumination beam path; wherein
    an optical axis of the illumination objective lies in a plane which forms with a normal of the specimen plane with respect to which the specimen carrier is aligned an illumination angle that differs from zero, and illumination takes place in said plane between the detection objective and the detector in the detection beam path
    a beam-shaping means in the illumination beam path for producing a light sheet of the illumination radiation;
    a detection optical unit with a detection objective in a detection beam path extending along an optical axis of which forms with a normal of the specimen plane (4) a detection angle that differs from zero,
    a detection objective for capturing a specimen detection radiation;
    a spatially resolving detector for a two-dimensional capture of image points of the specimen detection radiation;

and a correction element for the correction of aberrations of the specimen detection radiation between the detection objective and the detector: in the detection beam path;

and a control device for the actuation and controlled setting of the correction element; wherein the control device is configured to bring about a flawed correction setting on the basis of a best-possible correction setting of the correction element, with which aberrations occurring at the time are reduced as much as possible, in order to produce an asymmetric point spread function of the specimen detection radiation;

the control device comprises an analysis unit, which is designed and configured for the evaluation of image data captured at the time and the generation of corresponding control commands for actuating actuators of the correction elements to produce said asymmetric point spread function of the specimen detection radiation, said control device comprises an analysis unit which is designed and configured for the evaluation of image date captured at the time and the generation of corresponding control commands for actuating actuators of the correction elements.

6. The microscope as claimed in claim 5, wherein the correction element is formed by a pair of Alvarez plates.

7. The microscope as claimed in claim 5 and having a nonupright arrangement.

8. The microscope as claimed in claim 7 having an inverted embodiment, comprising

16 an illumination optical unit with an illumination objective for the illumination of a specimen located on a specimen carrier in a specimen region of a specimen plane by means of an illumination radiation over an illumination beam path, wherein an optical axis of the illumination objective lies in a plane which forms with a normal of the specimen plane with respect to which the specimen carrier is aligned an illumination angle that differs from zero, and illumination takes place in said plane, a beam-shaping means in the illumination beam path for producing a light sheet of the illumination radiation; and a detection optical unit with a detection objective in detection beam path along an optical axis of which forms with a normal of the specimen plane (4) a detection angle that differs from zero.

9. The microscope as claimed in claim 8, wherein the optical element for the pre-correction takes the form of a meniscus lens and is arranged both in the illumination beam path and in the detection beam path.

10. The microscope as claimed in claim 5 having an upright arrangement.

11. The microscope as claimed in claim 5, wherein between the specimen carrier and the objectives there is an optical element, which is designed for the pre-correction of aberrations caused by detection radiation and/or illumination radiation of the specimen passing through media of different refractive power, and the correction element is designed for the correction of persisting aberrations.

* * * * *